Feb. 3, 1942. F. L. CREAGER 2,271,968
REVERSIBLE ELECTRIC MOTOR
Original Filed June 30, 1937
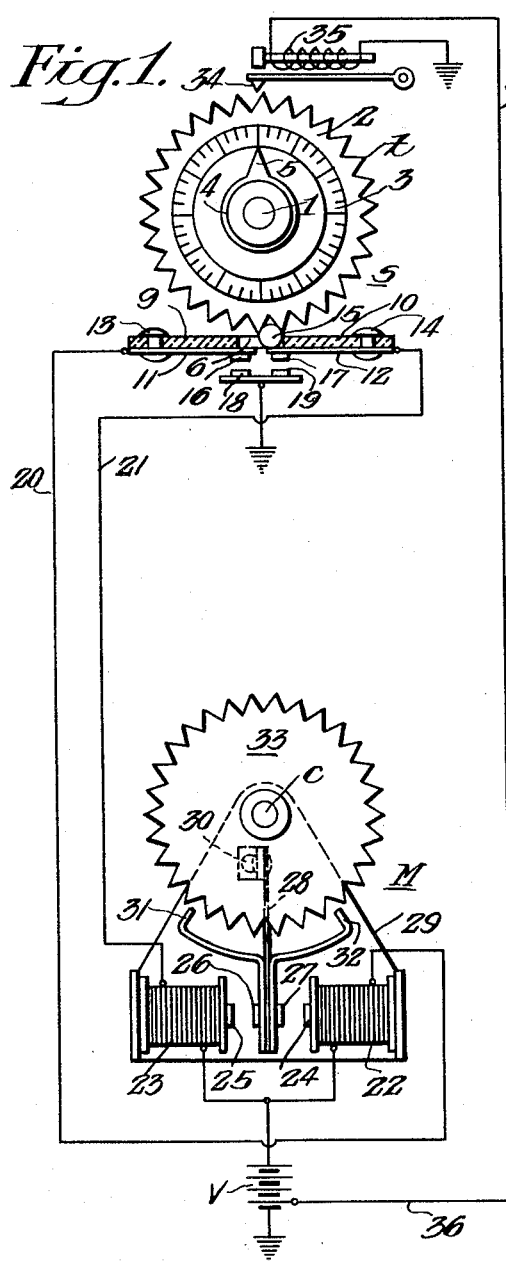
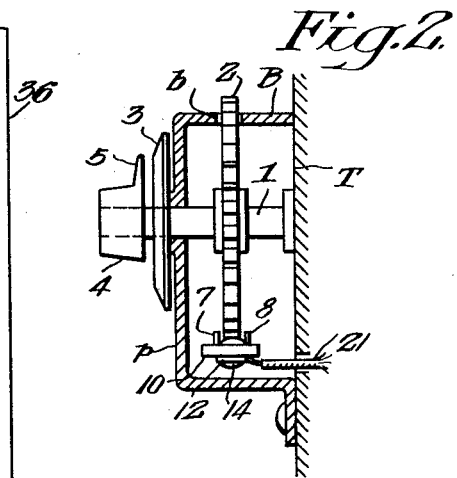
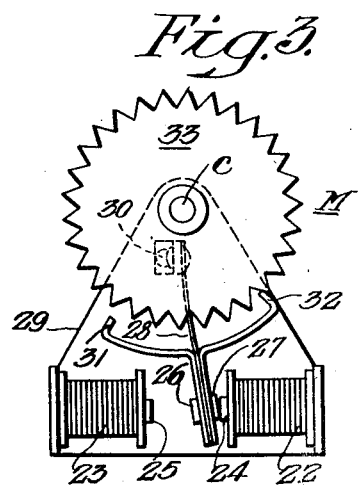
Inventor
Frederick L. Creager
By
Attorney Patented Feb. 3, 1942

2,271,968

UNITED STATES PATENT OFFICE 2,271,968

REVERSIBLE ELECTRIC MOTOR

Frederick L. Creager, Camden, N. J., assignor to Radio Corporation of America, a corporation of Delaware Original application June 30, 1937, Serial No. 151,080. Divided and this application December 30, 1938, Serial No. 248,385

3 Claims. (Cl. 172—126)

This case is a division of application Serial No. 151,080, filed June 30, 1937, now Patent No. 2,166,680.

This invention relates to reversible electric motors.

While the invention will be described as embodied in a remote control system for radio receivers, it is not limited to such application, as the disclosure in this respect is merely illustrative for purposes of explaining the inventive concept.

The prior art is replete with remote motor-control systems for achieving a desired angular setting of the condenser or other tuning element in radio receivers and transmitters. One difficulty encountered in systems employing conventional motors for rotating the condenser shaft is due to the tendency of the motor to coast or "overrun" whereby various approximate settings of the condenser are achieved. This necessitates the use of motor clutch mechanisms which are costly and complicated and which do not usually entirely solve the problem as is evidenced by the common practice of employing automatic frequency control (A. F. C.) circuits to compensate for inaccuracies in the mechanical steps incident to the tuning operation.

Attempts to utilize motors capable of driving the tuning element in a number of discrete steps in either direction and without the use of duplicate parts (as in systems using so-called "selsyn motors"), clutches, or A. F. C. have not met with a wide degree of success either because the incremental movements of the tuning shaft were too large to achieve accuracy of tuning or because of slowness in achieving the desired setting.

Accordingly, a principal object of the present invention is to provide a reversible electric motor capable of driving a condenser or like shaft rapidly and accurately to any desired position.

Another object of the invention is to provide a simple, inexpensive and trouble-free reversible electric motor.

Other objects and advantages, together with certain details of construction, will be apparent and the invention itself will be best understood by reference to the following specification and to the accompanying drawing wherein Figure 1 is an elevational view, partly schematic, of a reversible electric motor and a remotely disposed switch connected thereto, all in accordance with the principle of the invention, Figure 2 is a side elevational view of the switch of Figure 1 enclosed in a suitable case, and Figure 3 is a front elevational view of the motor of Figure 1 in operation.

In the drawing (wherein like reference characters represent the same or corresponding parts in all figures) S designates generally a switch mechanism, M a reversible electric motor controlled by the switch, and C is a shaft, say a condenser shaft, to be driven by the motor.

Referring first to the switch mechanism as shown in Figs. 1 and 2: Here 1 designates a shaft which may be a mere stub shaft mounted for rotation as in a container B (Fig. 2) which may be fixed to the instrument panel P of an automobile which carries a remotely mounted radio receiver (symbolically indicated by the condenser shaft C, Fig. 1). Shaft 1 has a toothed wheel 2 fixed thereon preferably in position to be grasped by the fingers of the operator. As shown in Fig. 2, a portion of the periphery of the wheel may extend through a slot b provided for that purpose in the casing B. The face of the wheel 2 may be calibrated to indicate the angular position of shaft 1; alternatively the calibrations may be marked upon an auxiliary dial 3 fixed, for example, to the front panel p of case B. A knob 4 provided with a pointer 5 is secured to shaft 1.

When the auxiliary dial 3 and knob 4 are employed they are preferably arranged close to the toothed wheel 2 so that either the knob or the periphery of the toothed wheel may be grasped to rotate shaft 1. In this case the knob may be employed in making coarse adjustments (as in interstation tuning) and the wheel 2 for making relatively fine adjustments (as in completing the tuning operation).

There is a ball-retaining slot 6 adjacent the lower portion of the periphery of the toothed wheel 2. Slot 6 may be constituted of a pair of pins 7, 8 (Fig. 2), one on each side of the wheel, a pair of stops 9 and 10 (Fig. 1) spaced from each other in a plane tangent to the periphery of the wheel. The base of the slot 6 may comprise the surface of the terminal-free ends of a pair of spring arms 11 and 12 which extend toward but do not touch each other from oppositely located fixed supports 13, 14, respectively. There is a ball 15 movable in the slot 6 in contact with the teeth t of the wheel; the diameter of this ball is preferably substantially equal to one-half the length of the slot 6 whereby it may be moved by the teeth to one end or the other of the slot as determined by the direction of rotation of the shaft 1 and wheel 2.

The underside of each spring arm 11, 12 carries a contact 16, 17, respectively, and there is a fixed contact 18, 19 for each movable contact. Since the spring-actuated contacts 16, 17 cannot be moved simultaneously, a common fixed contact may be employed instead of the duplicate fixed contacts. When the ball 15 is at one end of the slot 6, say in the position shown in Fig. 1, a continuation of the counter-clockwise movement of the toothed wheel will actuate the spring arm 12 in discrete steps by reason of the force applied to the ball when the teeth are moved thereover. Clockwise movement of the shaft 1 and toothed wheel 2 will send the ball 15 to the opposite side of the slot 6 and continued movement in that direction will close and open contacts 16 and 18 as determined by the number of teeth successively moved over the ball 15. Each time the contacts 16, 18 or 17, 19 are closed a discrete electrical impulse is transmitted to the conductive leads 20, 21 connected therewith.

Leads 20 and 21 are connected respectively to the field windings 22 and 23 of motor M. When the apparatus is designed for the purpose described, these windings may be ordinary bell-type coils provided with oppositely located, aligned pole pieces or contacts 24, 25.

Current for the motor M is supplied under control of switch S as by a battery V suitably connected between the coils 22 and 23. Current flowing in one or the other of these coils generates a magnetic field which actuates an armature 26, 27 suspended therebetween on a support 28. Armature support 28 is preferably in the form of a "Hardinge spring" secured at its upper end to a panel or plate 29, as by a rivet 30 beneath the condenser shaft C. The spring 28 also carries a bipart or bifurcated pawl, the duplicate ends 31, 32 of which are adapted to enter the space between the teeth on the periphery of a toothed wheel 33 which is fixed on the condenser shaft C.

As the switch wheel 2 is rotated, one or the other of the switch arms 11 or 12 completes the circuit to the coil associated therewith. Referring to Fig. 3 and assuming that coil 22 is momentarily energized, it will be noted that the armature support 28 is flexed in being pulled over toward the pole piece 24. Preferably the magnetic field generated by the coils is of sufficient initial intensity to produce an immediate substantial flexing of the armature spring 28 and, since it is flexed in the direction in which the wheel 33 and shaft C are to be rotated, the pawl 32 engages much more quickly than it would in the case of a nonyielding pawl support. Because the spring is fixed at a point 30 intermediate the periphery of wheel 33 and the axis of shaft C, the pawls 31—32 in engaging the teeth will move in a radius less than that of the wheel 33 whereby rapid movement is effected in response to the rapid discrete impulses applied to the coil 22 (or 23) through the reversing switch S.

It will be further noted that since the pawls are spring mounted, the radius and hence the arc traversed by the pawls will be greater during the disengaging movement than in the engaging movement so that the pawls are "self-disengaging," i. e., on the return stroke there is ample clearance between a pawl and the "trailing" tooth.

In the drawing the controlling (switch) wheel 2 and the controlled (motor) wheel 33 are of duplicate construction. When the invention is applied to a radio receiver employing a tuning shaft (C) rotatable through but 180° and a switch shaft 1 rotatable through 360°, it is preferable to provide the motor wheel 33 with twice the number of teeth employed on the switch wheel 2 whereby the degree of movement of the driving wheel required to pass a given number of its teeth over the ball 15 produces one-half that degree of movement of the driven motor ratchet wheel 33. The size and pitch of the teeth on these wheels 2 and 33 may be of substantially any desired degree of fineness (the previously described fast-acting circuit closing and shaft-driving mechanisms permitting this).

In assembling the apparatus of the invention, the dial 3 and pointer 5 on the control or switch shaft 2 will, of course, be arranged to correspond with the angular position of shaft C. To maintain an accurate dial indication of the angular position of shaft C (for example, in the event of failure of current from source V), a detent 34 actuated by a magnet 35 connected as by a lead 36 to source V may be provided for locking the control shaft in the position to which it was last moved.

Other modifications of the invention will suggest themselves to those skilled in the art. It is to be understood, therefore, that the foregoing is to be interpreted as illustrative and not in a limiting sense except as required by the prior art and by the spirit of the appended claims.

What is claimed is:

1. An electric motor comprising a ratchet wheel, a flexible armature, a pair of pawls fixedly supported on said flexible armature for movement in a radius less than that of said ratchet wheel, and means for flexing said armature in the direction said wheel is to be driven.

2. A reversible electric motor comprising a rotatable member, a flexible arm fixedly supported adjacent one end thereof, an armature and a pair of pawls fixedly supported on said flexible arm remote from its point of support, said pawls extending in opposite directions about the periphery of said rotatable member and adapted to selectively engage and drive said member in a direction determined by the direction in which said flexible arm is flexed, and means for flexing said flexible arm in a selected direction.

3. A reversible electric motor comprising a rotatable member having an axis of rotation, a pair of electromagnets mounted in spaced relation beyond the periphery of said rotatable member, an armature comprising an arm constituted of spring material fixedly mounted at one end intermediate the ends of a radial line extending between said axis of rotation and a point midway between said pair of electromagnets, said flexible arm being adapted to be flexed upon the application of an energizing force to a selected one of said pair of electromagnets, and a pair of pawls fixedly supported on said flexible arm, said pawls extending in opposite directions about the periphery of said rotatable member and adapted to selectively engage and drive said rotatable member in a direction determined by the direction in which said flexible arm is flexed.

FREDERICK L. CREAGER.